US009095030B2

(12) United States Patent
Choi (10) Patent No.: US 9,095,030 B2
(45) Date of Patent: Jul. 28, 2015

(54) PIXEL AND ORGANIC LIGHT EMITTING DISPLAY DEVICE USING THE PIXEL

(75) Inventor: Sang-Moo Choi, Yongin (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 352 days.

(21) Appl. No.: 13/215,727

(22) Filed: Aug. 23, 2011

(65) Prior Publication Data

US 2012/0139961 A1    Jun. 7, 2012

(30) Foreign Application Priority Data

Dec. 6, 2010    (KR) .......................... 10-2010-0123439

(51) Int. Cl.
*G09G 3/32* (2006.01)
*G09G 5/10* (2006.01)
*H05B 33/08* (2006.01)

(52) U.S. Cl.
CPC .......... *H05B 33/0896* (2013.01); *G09G 3/3208* (2013.01); *Y02B 20/36* (2013.01)

(58) Field of Classification Search
CPC .............. G09G 3/3208; G09G 3/3233; G09G 2300/0426; G09G 2300/0819; G09G 2300/0842; G09G 2300/0852; G09G 2300/0861; G09G 2300/0866; G09G 2320/043; G09G 2320/045; G09G 2310/0262; H01L 27/3276; H05B 33/0896; Y02B 20/36
USPC .......... 345/76, 77, 78, 82, 83, 690; 315/169.3
See application file for complete search history.

(56) References Cited

U.S. PATENT DOCUMENTS

| 7,180,486 | B2 * | 2/2007 | Jeong ............................. 345/82 |
| 2004/0047143 | A1 * | 3/2004 | Maruyama ..................... 362/84 |
| 2005/0083270 | A1 * | 4/2005 | Miyazawa ...................... 345/76 |
| 2005/0242746 | A1 * | 11/2005 | Miyagawa et al. ........ 315/169.3 |
| 2009/0273590 | A1 * | 11/2009 | Tanikame et al. ............. 345/211 |
| 2009/0284511 | A1 * | 11/2009 | Takasugi et al. ............. 345/211 |
| 2010/0156762 | A1 * | 6/2010 | Choi ............................. 345/76 |
| 2011/0025586 | A1 * | 2/2011 | Lee .............................. 345/76 |
| 2011/0025671 | A1 |  2/2011 | Lee |

FOREIGN PATENT DOCUMENTS

| KR | 10-2005-0005646 A | 1/2005 |
| KR | 10-2006-0091271 A | 8/2006 |
| KR | 10-2007-0083072 A | 8/2007 |
| KR | 10-2008-0012220 A | 2/2008 |
| KR | 10-2011-0013693 A | 2/2011 |

* cited by examiner

*Primary Examiner* — Stephen Sherman
(74) *Attorney, Agent, or Firm* — Lee & Morse, P.C.

(57) ABSTRACT

A pixel may include: an OLED; a first transistor having a first electrode connected to a power line receiving a first power, the first power changes to an initial voltage, a reference voltage, and a high voltage, the first transistor controlling the amount of current supplied to the OLED; a second transistor connected between a data line and a second node and turned on when a scan signal is supplied to a scan line; a third transistor connected between a gate electrode and a second electrode of the first transistor and having a turn-on time partially overlapping the turn-on time of the second transistor; a fourth transistor, connected between the second node and the power line, and having a turn-on time not overlapping the turn-on time of the second transistor; and a storage capacitor connected between the gate electrode of the first transistor and the second node.

26 Claims, 6 Drawing Sheets

CONVENTIONAL ART

FIG. 9

PIXEL AND ORGANIC LIGHT EMITTING DISPLAY DEVICE USING THE PIXEL

BACKGROUND

1. Field

Embodiments relate to a pixel and an organic light emitting display device using the pixel. More particularly, the present embodiments relate to a pixel that can display an image having uniform luminance, regardless of the threshold voltage of a driving transistor.

2. Description of the Related Art

Recently, a variety of flat panel displays have been developed that make it possible to reduce the weight and volume of cathode ray tubes. Typical flat panel displays may be a liquid crystal display, a field emission display, a plasma display panel, an organic light emitting display device, etc.

The organic light emitting display device displays an image using an organic light emitting diode. The organic light emitting diode produces light by recombining an electrode and a hole. The organic light emitting display device has the advantage of high response speed and low power.

SUMMARY

Therefore, present embodiments may provide a pixel.

A pixel according to an embodiment may include: an organic light emitting diode; a first transistor having a first electrode connected to a power line receiving a first power, the first power changes to an initial voltage, a reference voltage, and a high voltage, the first transistor controlling the amount of current supplied to the organic light emitting diode; a second transistor connected between a data line and a second node, the second transistor turned on when a scan signal is supplied to a scan line; a third transistor connected between a gate electrode and a second electrode of the first transistor, the third transistor having a turn-on time partially overlapping the turn-on time of the second transistor; a fourth transistor connected between the second node and the power line, the fourth transistor having a turn-on time not overlapping the turn-on time of the second transistor; and a storage capacitor connected between the gate electrode of the first transistor and the second node.

The pixel may further include a capacitor connected between an anode electrode of the organic light emitting diode and a fixed power supply. The pixel may further include a fifth transistor positioned between a common power line receiving high voltage and the power line, the fifth transistor turned on when the high voltage is supplied to the power line. The high voltage supplied to the power line may not overlap the turn-on periods of the second transistor and the third transistor.

An organic light emitting display device according to an embodiment may include: a plurality of pixels connected with scan lines, emission control lines, power lines, and data lines; a scan driver driving the scan lines, the emission control lines, and control lines; a first power driver sequentially supplying a first power to the power lines, the first power changes to an initial voltage, a reference voltage, higher than the initial voltage, and a high voltage, higher than the reference voltage; and a data driver supplying data signals to the data lines; in which each pixel of the plurality of pixels in the i-th horizontal line includes: an organic light emitting diode; a first transistor having a first electrode connected to the i-th power line, the first transistor controlling the amount of current supplied to the organic light emitting diode; a second transistor connected between the data line and a second node, the second transistor turned on when a scan signal is supplied to the i-th scan line; a third transistor connected between a gate electrode and a second electrode of the first transistor, the third transistor turned on when a control signal is supplied to the i-th control line; a fourth transistor connected between the second node and the power line, the fourth transistor turned off when an emission control signal is supplied to the i-th emission control line, the fourth transistor turned on in other cases; and a storage capacitor connected between the gate electrode of the first transistor and the second node.

The scan driver may supply a control signal to the i-th control line for a period where the reference voltage is supplied to the i-th power line. The scan driver may supply a scan signal to the i-th scan line to overlap the control signal supplied to the i-th control line. The first power driver may supply the high voltage to the i-th power line, after the pixel in the i-th horizontal line is charged with voltage corresponding to a data signal. The scan driver may supply an emission control signal to the i-th emission control line to overlap the scan signal supplied to the i-th scan line. The initial voltage may be set to a voltage where the pixels are in a non-emission state.

An organic light emitting display device according to another embodiment may include: a plurality of pixels connected with scan lines, emission control lines, power lines, and data lines; a scan driver sequentially supplying scan signals overlapping each other for a predetermined period to the scan lines, the scan driver sequentially supplying emission control signals to the emission control lines; a first power driver sequentially supplying a first power to the power lines, the first power changes to an initial voltage, a reference voltage, higher than the initial voltage, and a high voltage, higher than the reference voltage; and a data driver supplying data signals to the data lines; in which a pixel of the plurality of pixels in the i-th horizontal line includes: an organic light emitting diode; a first transistor having a first electrode connected to the i-th power line, the first transistor controlling the amount of current supplied to the organic light emitting diode; a second transistor connected between the data line and a second node, the second transistor turned on when a scan signal is supplied to the i-th scan line; a third transistor connected between a gate electrode and a second electrode of the first transistor, the third transistor turned on when a scan signal is supplied to the i−1-th scan line; a fourth transistor connected between the second node and the power line, the fourth transistor turned off when an emission control signal is supplied to the i-th emission control line, the fourth transistor turned on in other cases; and a storage capacitor connected between the gate electrode of the first transistor and the second node.

BRIEF DESCRIPTION OF THE DRAWINGS

The accompanying drawings, together with the specification, illustrate exemplary embodiments, and, together with the description, serve to explain the principles of the inventive concept.

DETAILED DESCRIPTION

Korean Patent Application No. 10-2010-0123439, filed on Dec. 6, 2010, in the Korean Intellectual Property Office, and entitled: "Pixel and Organic Light Emitting Display Device Using the Pixel" is incorporated by reference herein in its entirety.

The inventive concept will now be described more fully hereinafter with reference to the accompanying drawings, in which exemplary embodiments of the inventive concept are illustrated. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art.

Preferred embodiments for those skilled in the art to easily implement are described in detail with reference to FIGS. 1-8.

Figure 1:
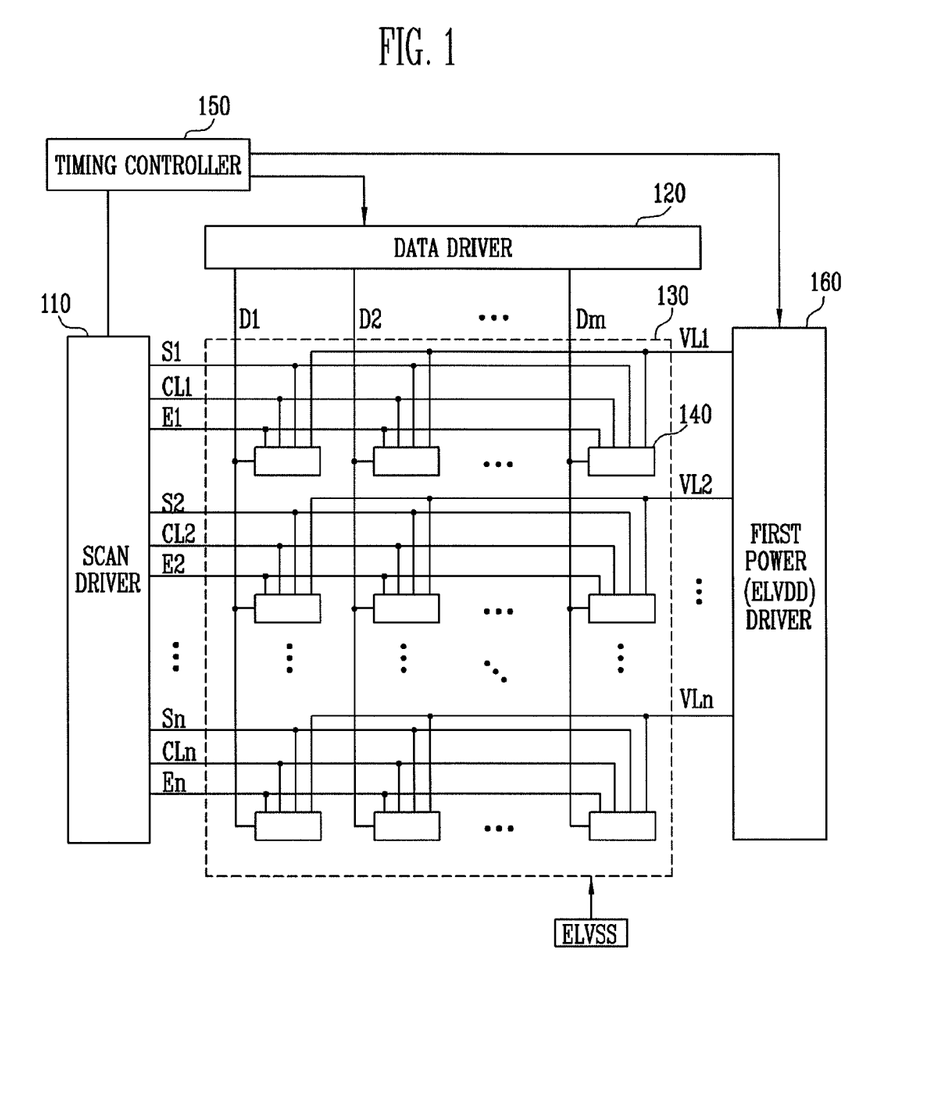
FIG. 1 is a diagram illustrating an organic light emitting display device according to an embodiment.

FIG. 1 is a diagram illustrating an organic light emitting display device according to an embodiment.

Referring to FIG. 1, an organic light emitting display device according to an embodiment includes: a pixel unit 130 including pixels 140 disposed at the intersections of scan lines S1 to Sn and data lines D1 to Dm, a scan driver 110 that drives the scan lines S1 to Sn, control lines CL1 to CLn, and emission control lines E1 to En, a data driver 120 that drives the data lines D1 to Dm, a first power driver 160 that drives power lines VL1 to VLn, and a timing controller 150 that controls the drivers 110, 120, and 160.

The first power driver 160 sequentially supplies a first voltage ELVDD to the power lines VL1 to VLn. The first voltage ELVDD changes to an initial voltage Vint, a reference voltage Vref, and a high voltage Vhigh.

Figure 3:
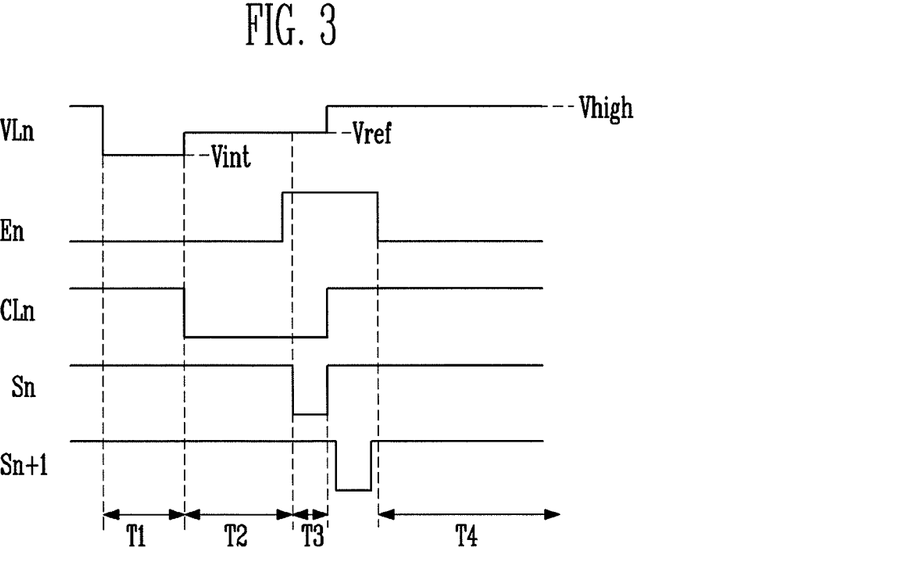
FIG. 3 is a waveform diagram illustrating a method of driving the pixel shown in FIG. 2.

As shown in FIG. 3, the first power driver 160 supplies the initial voltage Vint, the reference voltage Vref, higher than the initial voltage Vint, and the high voltage Vhigh, higher than the reference voltage Vref, to the power line VLn. In this configuration, the first power driver 160 supplies the reference voltage Vref to the n-th power line VLn to overlap a scan signal supplied to the n-th scan line Sn. The initial voltage Vint is set at a sufficiently low voltage, so that the organic light emitting diode (OLED) is in a non-emission state. After the pixel 140 is charged with the voltage corresponding to the data signal, the high voltage Vhigh is set at a sufficiently high voltage, so that the organic light emitting diode (OLED) is set in an emission state.

The scan driver 110 sequentially supplies scan signals to the scan lines S1 to Sn. The scan driver 110 also sequentially supplies emission control signals to the emission control lines E1 to En. The scan driver 110 sequentially supplies control signals to the control lines CL1 to CLn.

In this process, the scan driver 100 supplies an emission control signal to the i-th emission control line Ei to overlap the scan signal supplied to the i-th second scan line Si (i is a natural number). The scan driver 110 supplies a control signal to the i-th control line CLi to overlap the reference voltage Vref supplied to the i-th power line VLi.

Although FIG. 1 shows when the scan lines S1 to Sn, the emission control lines E1 to En, and control lines CL1 to CLn are connected to the scan driver 110, the present embodiments are not limited thereto. For example, the emission control lines E1 to En and the control lines CL1 to CLn may be connected to individual drivers (not shown).

The data driver 120 supplies data signals to the data lines D1 to Dm in synchronization with the scan signals supplied to the scan lines S1 to Sn.

In response to synchronization signals supplied from the outside, the timing control unit 150 controls the scan driver 110, the data driver 120, and the first power driver 160.

When the initial voltage Vint is supplied to the first power supply ELVDD, the pixel 140 initializes the anode electrode of the organic light emitting diode (OLED) to the initial voltage Vint. When the reference voltage Vref is supplied, the pixel 140 is charged with the threshold voltage of the driving transistor and the voltage corresponding to the data signal. When the high voltage Vhigh is supplied to the first power supply ELVDD, the pixel 140 produces light with predetermined luminance while supplying current corresponding to the charged voltage to the organic light emitting diode (OLED).

Figure 2:
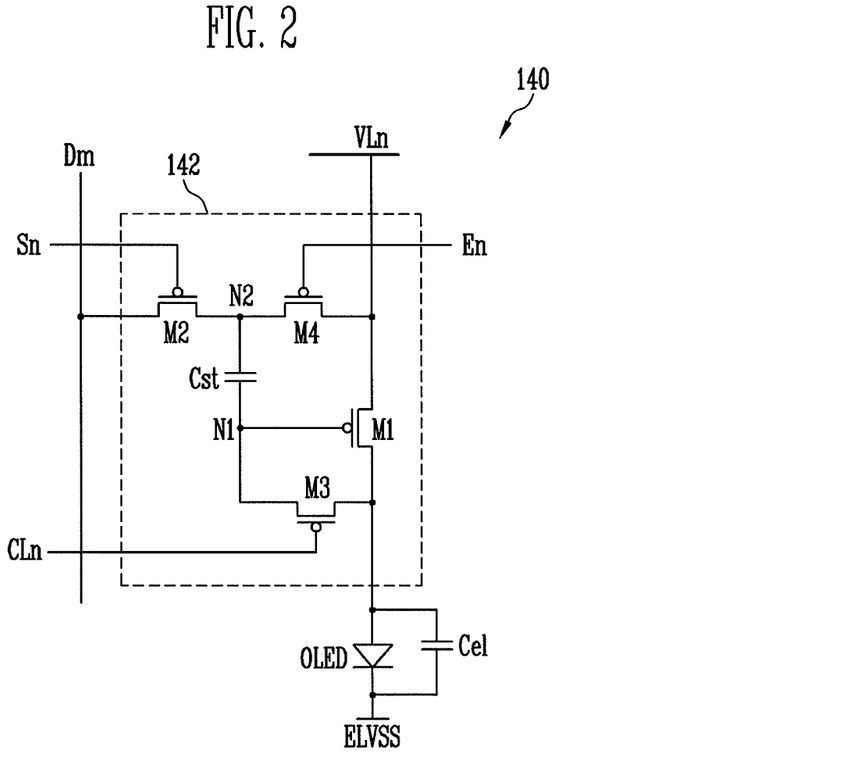
FIG. 2 is a circuit diagram illustrating a pixel according to a first embodiment.

FIG. 2 is a diagram illustrating a pixel according to a first embodiment. The pixel, connected with the n-th scan line Sn and the m-th data line Dm, is shown in FIG. 2.

Referring to FIG. 2, the pixel 140, according to an embodiment includes: an organic light emitting diode (OLED) and a pixel circuit 142 connected to the data line Dm and the scan line Sn. The pixel circuit 142 controls the amount of current supplied to the organic light emitting diode (OLED).

The anode electrode of the organic light emitting diode (OLED) is connected to the pixel circuit 142. The cathode electrode is connected to a second power supply ELVSS. In response to the amount of current supplied from the pixel circuit 142, the organic light emitting diode (OLED) produces light with predetermined luminance.

The pixel circuit 142 receives a data signal through the data line Dm when a scan signal is supplied to the scan line Sn. In response to the received data signal, the pixel circuit 142 controls the current flowing from the first power supply ELVDD at the high voltage Vhigh to the second power supply ELVSS through the organic light emitting diode (OLED). For this operation, the pixel circuit 142 includes first to fourth transistors M1 to M4 and a storage capacitor Cst.

The storage capacitor Cst is connected between a first node N1 and a second node N2. The storage capacitor Cst is charged at a voltage corresponding to a data signal and threshold voltage of the first transistor M1 (driving transistor).

The first electrode of the first transistor M1 is connected to a power line VLn. The second electrode is connected to the anode electrode of the organic light emitting diode (OLED). A gate electrode of the first transistor M1 is connected to the first node N1. In response to the voltage applied to the first node N1, the first transistor M1 controls the amount of current supplied to the organic light emitting diode (OLED).

A first electrode of the second transistor M2 is connected to the data line Dm. A second electrode is connected to the second node N2. A gate electrode of the second transistor M2 is connected to the scan line Sn. When the scan signal is supplied to the scan line Sn, the second transistor M2 is turned on and electrically connects the data line Dm with the second node N2.

A first electrode of the third transistor M3 is connected to a second electrode of the first transistor M1. A second electrode is connected to the first node N1. A gate electrode of the third transistor M3 is connected to a control line CLn. When a scan signal is supplied to the control line CLn, the third transistor M3 is turned on, and is diode connected to the first transistor M1.

A first electrode of the fourth transistor M4 is connected to the power line VLn. A second electrode is connected to the second node N2. A gate electrode of the fourth transistor M4 is connected to the emission control line En. When an emission control signal is supplied to the emission control line En, the fourth transistor M4 is turned off. When an emission control signal is not supplied, the fourth transistor M4 is turned on.

As shown in FIG. 2, the capacitor Cel implies a parasitic capacitor of the organic light emitting diode (OLED). The parasitic capacitor Cel has a larger capacitance than the storage capacitor Cst.

FIG. 3 is a waveform diagram illustrating a method of driving the pixel shown in FIG. 2. To show the supply characteristics of the waveforms, FIG. 3 shows a scan signal that is supplied to a virtual n+1-th scan line Sn+1.

Referring to FIG. 3, the initial voltage Vint is supplied to the power line VLn for a first period T1. As the initial voltage Vint is supplied to the power line VLn, the anode electrode of the organic light emitting diode (OLED) drops to the initial voltage Vint. The parasitic capacitor Cel is charged with the initial voltage Vint.

For a second period T2, while a control signal is supplied to the control line CLn, the reference voltage Vref is supplied to the power line VLn. As the control signal is supplied to the control line CLn, the third transistor M3 is turned on. As the third transistor M3 is turned on, the first node N1 and the anode electrode of the organic light emitting diode (OLED) are electrically connected. In this state, the voltage of the first node N1 drops approximately to the initial voltage Vint, corresponding to the voltage stored in the parasitic capacitor Cel.

The reference voltage Vref, supplied to the power line VLn, is supplied to the first electrode of the first transistor M1. Accordingly, the voltage of the first node N1 increases up to the voltage Vref−|Vth|. The voltage Vref−|Vth| is obtained by subtracting the threshold voltage of the first transistor from the reference voltage Vref.

The second period T2 can be set by controlling the control line CLn and the supply time of the reference voltage Vref. In other words, the present embodiments have the advantage of being able to set the second period T2, compensating the threshold voltage of the first transistor, above a first horizontal period 1H.

A scan signal is supplied to the scan line Sn. An emission control signal is supplied to the emission control line En for a third period T3.

As the emission control signal is supplied to the emission control line En, the fourth transistor M4 is turned off. When the fourth transistor M4 is turned off, the power line VLn and the second node N2 are electrically disconnected.

As the scan signal is supplied to the scan line Sn, the second transistor M2 is turned on. When the second transistor is turned on, the data line Dm and the second node N2 are electrically connected. In this state, a data signal from the data line Dm is supplied to the second node N2. Accordingly, the voltage of the second node N2 changes from the reference voltage Vref to the voltage of the data signal. In this case, the storage capacitor Cst is charged with voltage expressed by Formula 1.

$$Cst(V) = \frac{Cst}{(Cst + Cel)} \times (Vdata - Vref) + Vref - |Vth| \qquad \text{[Formula 1]}$$

In Formula 1, CSt(V) is the voltage changed in the storage capacitor Cst. Vdata is voltage of a data signal. Vth is the threshold voltage of the first transistor M1. Since the voltage of the reference power Vref is supplied to the power line VLn for the third period T3, unnecessary current does not flow to the organic light emitting diode (OLED).

The high voltage Vhigh is supplied to the power line VLn for a fourth period T4. The supply of an emission control signal to the emission control line En stops. As the supply of an emission control signal to the emission control line En stops, the fourth transistor M4 is turned on. Thus, the second node N2 and the power line VLn are electrically connected.

The high voltage Vhigh, supplied to the power line VLn, is supplied to the second node N2 and the first electrode of the first transistor M1. Since the first node N1 is set in a floating state, regardless of a change in voltage of the second node N2, the storage capacitor Cst keeps the voltage stored in the previous period. In response to the voltage stored in the storage capacitor Cst, the first transistor M1, that has received the high voltage Vhigh through the first electrode, controls the amount of current flowing from the high voltage Vhigh to the second power supply ELVSS through the organic light emitting diode (OLED).

Using the pixel circuit 142 including four transistors M1 to M4 and one capacitor Cst, the present embodiments described above have the advantage of being able to compensate the threshold voltage of the driving transistor M1.

According to the present embodiment, it is possible to remove non-uniformity of an image. Non-uniformity of an image is removed because an off-bias voltage is applied to the first transistor M1 for the first period T1. To be more specific, when an off-bias voltage is not applied to the first transistor M1, luminance increases in a staircase waveform as the white gradation is implemented from black. In the present embodiments, it is possible to display an image with desired luminance without luminance non-uniformity by applying an off-bias voltage to the first transistor M1 for the first period T1.

Regardless of the first power ELVDD, as expressed by Formula 1, the voltage is stored in the storage capacitor Cst. Thus, regardless of the voltage drop of the first power supply ELVDD in the present embodiments, it is possible to display an image with desired luminance. The present embodiment have the advantage of being able to compensate the threshold voltage of the first transistor M1 for a sufficient time by controlling the second period T2. The second period T2 is the time when the control signal and the reference voltage Vref are supplied.

Figure 4:
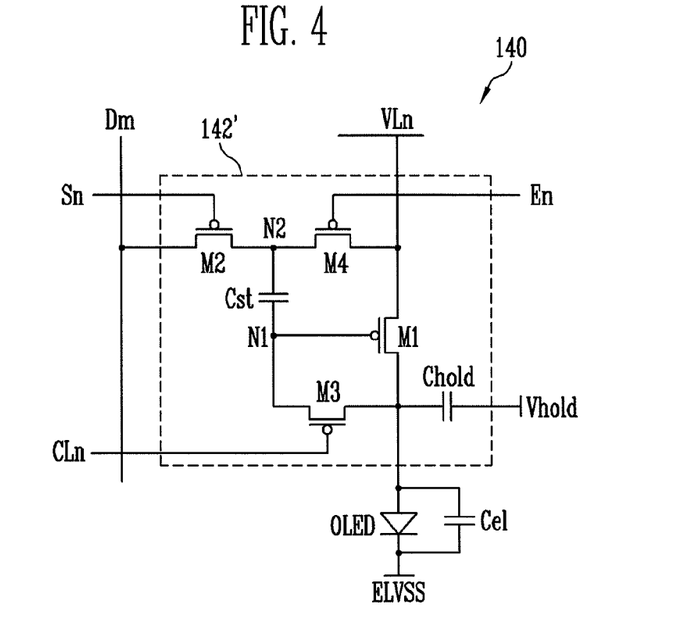
FIG. 4 is a circuit diagram illustrating a pixel according to a second embodiment.

FIG. 4 is a diagram illustrating a pixel according to a second embodiment. In explaining FIG. 4, the same components as in FIG. 2 are designated by the same reference numerals. Thus, the detailed description is not provided.

Referring to FIG. 4, a pixel circuit 142' according to the second embodiment includes a capacitor Chold connected between the anode electrode of an organic light emitting diode (OLED) and a fixed power supply Vhold.

As expressed in Formula 1, the voltage stored in the storage capacitor Cst is influenced by the storage capacitor Cst and the parasitic capacitor Cel. In this configuration, the storage capacitor Cst and the parasitic capacitor Cel is provided with a predetermined capacitance. Therefore, in the second embodiment, it is possible to control the voltage range of a data signal by forming and controlling the capacitance of the capacitor Chold. The fixed power supply Vhold has a fixed voltage (i.e. DC voltage), which is any one of voltages supplied to a panel.

Figure 5:
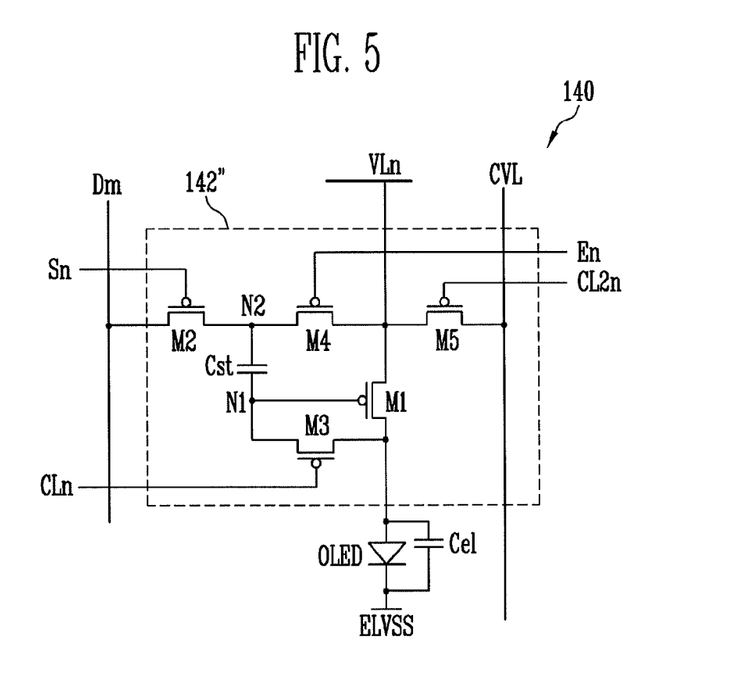
FIG. 5 is a circuit diagram illustrating a pixel according to a third embodiment.

FIG. 5 is a diagram illustrating a pixel according to a third embodiment. In explaining FIG. 5, the same components as in FIG. 2 are designated by the same reference numerals. Thus, the detailed description is not provided.

Referring to FIG. 5, a pixel circuit 142″, according to the third embodiment, includes a fifth transistor M5 connected between a common power line CVL and a power line VLn. The common power line CVL is connected with all pixels 140 and receives a high voltage Vhigh from a power supply (not shown). The fifth transistor M5 is connected between the power line VLn and the common power line CVL. The fifth transistor M5 is turned on when a second control signal is supplied to the second control line CL2n.

Figure 6:
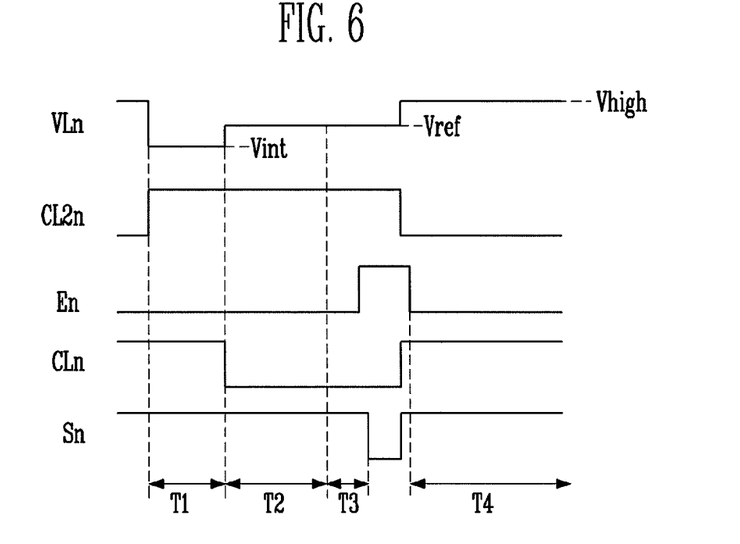
FIG. 6 is a waveform diagram illustrating a method of driving the pixel shown in FIG. 5.

In this configuration, the second control lines are formed in horizontal lines and receive the second control signals from a scan driver 110 or a specific driver (not shown). The second signal, supplied to the i-th second control line CL2i, is supplied to overlap the period where the high voltage Vhigh is supplied, with an exception for the period, as shown in FIG. 6, where the initial voltage Vint and the reference voltage Vref are supplied to the i-th power line VLi.

Accordingly, the fifth transistor M5 is turned on for the period where the high voltage Vhigh is supplied to the power line VLn. The fifth transistor M5 electrically connects the power line VLn with the common power line CVL. In this case, a voltage drop of the high voltage is minimized. Thus, image quality is improved.

Figure 7:
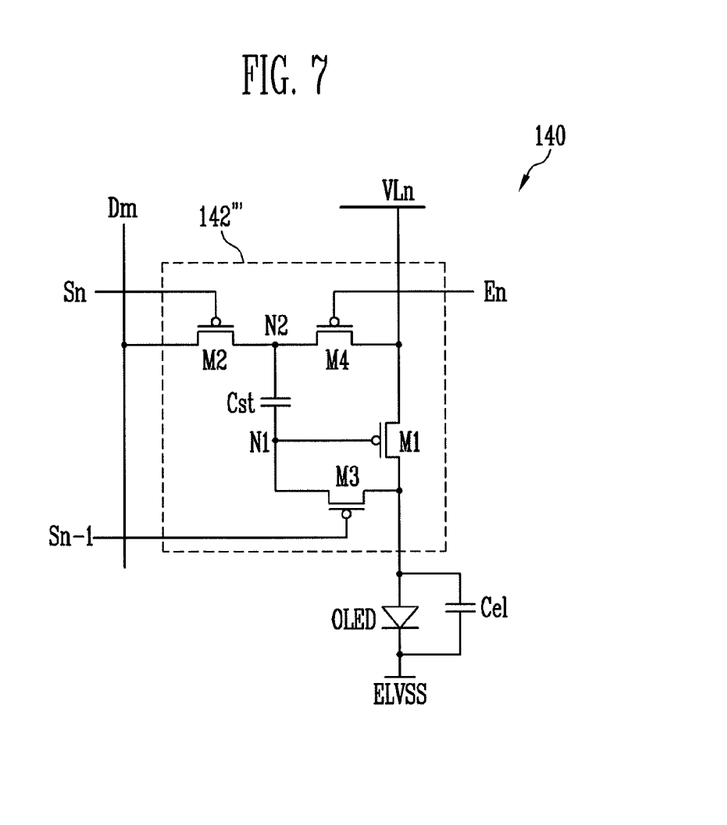
FIG. 7 is a circuit diagram illustrating a pixel according to a fourth embodiment.

FIG. 7 is a diagram illustrating a pixel according to a fourth embodiment. In explaining FIG. 7, the same components as in FIG. 2 are designated by the same reference numerals. Thus, the detailed description is not provided.

Referring to FIG. 7, a gate electrode of a third transistor M3′ in a pixel circuit 142‴, according to a fourth embodiment, is connected to the n−1-th scan line Sn−1. The third transistor M3′ is turned on when a scan signal is supplied to the n−1-th scan line Sn−1. In the other cases, the third transistor M3′ is turned off.

In comparing with the pixel circuit 142 shown in FIG. 2, the third transistor M3 is connected with the control line CLn. In this case, it is possible to freely set the time when the third transistor M3 is turned on. Accordingly, it is possible to sufficiently ensure the time for compensating the threshold voltage of the first transistor M1. However, it may be a burden to add a specific line (i.e. a control line) in this case.

The third transistor M3′ is connected with the n−1-th scan line Sn−1 in a pixel circuit 142‴ according to the fourth embodiment. In this case, the time when the third transistor M3′ is turned on is limited by the width of a scan signal. However, a specific line is not required. Since the third transistor M3′ is connected with the n−1-th scan line Sn−1, the scan signal supplied to the n−1-th scan line Sn−1 and the scan signal supplied to the n-th scan line Sn overlap each other at least for the one horizontal period 1H.

Figure 8:
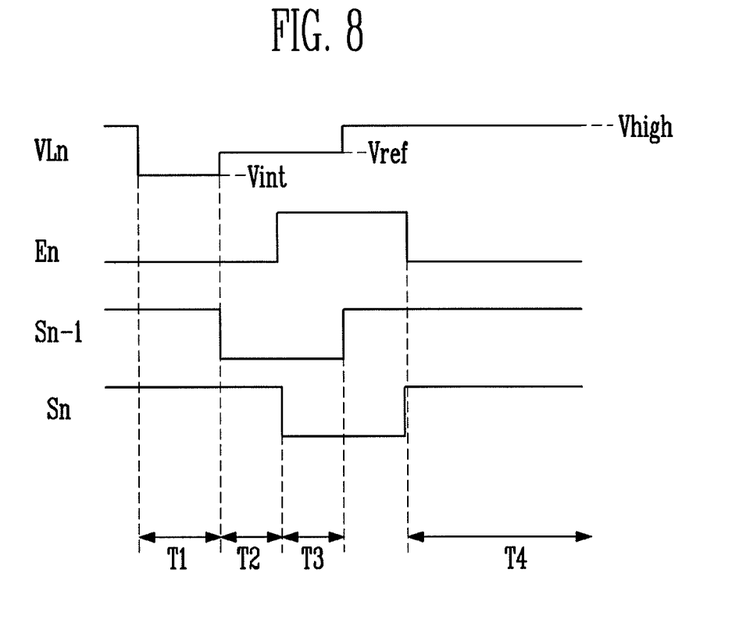
FIG. 8 is a waveform diagram illustrating a method of driving the pixel shown in FIG. 6.

FIG. 8 is a waveform diagram illustrating a method of driving the pixel shown in FIG. 7.

Referring to FIG. 8, the initial voltage Vint is supplied to the power line VLn for a first period T1. As the initial voltage Vint is supplied to the power line VLn, the anode electrode of the organic light emitting diode (OLED) drops to the initial voltage Vint. The parasitic capacitor Cel is charged with the initial voltage Vint.

While a scan signal is supplied to the n−1-th scan line Sn−1, for the second period T2, the reference voltage Vref is supplied to the power line VLn. As the scan signal is supplied to the n−1-th scan line Sn−1, the third transistor M3 is turned on. The first node N1 and the anode electrode of the organic light emitting diode (OLED) are electrically connected. In this state, the voltage of the first node N1 drops approximately to the initial voltage Vint, corresponding to the voltage stored in the parasitic capacitor Cel.

The reference voltage Vref supplied to the power line VLn is supplied to the first electrode of the first transistor M1. Accordingly, the voltage of the first node N1 increases from the initial voltage Vint up to the voltage Vref−|Vth|. The voltage Vref−|Vth| is obtained by subtracting the threshold voltage of the first transistor from the reference voltage Vref. The second period T2 is set as the time from when a scan signal is supplied to the n−1-th scan line Sn−1 till when the scan signal is supplied to the n-th scan line Sn. The second period T2 is when the threshold voltage of the first transistor M1 is compensated.

A scan signal is supplied to the n-th scan line Sn and an emission control signal is supplied to the emission control line En for the third period T3. The third period T3 is a period where the scan signals supplied to the n−1-th scan line Sn−1 and the n-th scan line Sn overlap each other.

As an emission control signal is supplied to the emission control line En, the fourth transistor M4 is turned off. When the fourth transistor M4 is turned off, the second node N2 and the power line are electrically disconnected.

As the scan signal is supplied to the n-th scan line Sn, the second transistor M2 is turned on. When the second transistor M2 is turned on, the second node N2 and the data line Dm are electrically connected. In this state, a data signal from the data line Dm is supplied to the second node N2. Accordingly, the voltage of the second node N2 changes from the reference voltage Vref to the voltage of the data signal. Thus, the storage capacitor Cst is charged with voltage expressed by Formula 1.

After the storage capacitor Cst is charged with the voltage expressed by Formula 1, a scan signal stops being supplied to the n−1-th scan line Sn−1. Accordingly, the first node N1 is set in a floating state. Regardless of whether the second transistor M2 is turned on, the capacitor Cst keeps the voltage stored for the third period T3.

An emission control signal stops being supplied to the emission control line En. For the fourth period T4, a high voltage is supplied to the power line VLn. As an emission control signal stops being supplied to the emission control line En, the fourth transistor M4 is turned on.

As the fourth transistor M4 is turned on, the high voltage Vhigh is supplied to the second node N2. For the third period T3, since the first node N1 is set in a floating state, the storage capacitor Cst keeps the voltage stored. In response to the voltage stored in the storage capacitor Cst, the first transistor M1, that has received the high voltage Vhigh through the first electrode, controls the amount of current flowing from the high voltage Vhigh to the second power supply ELVSS through the organic light emitting diode (OLED).

Figure 9:
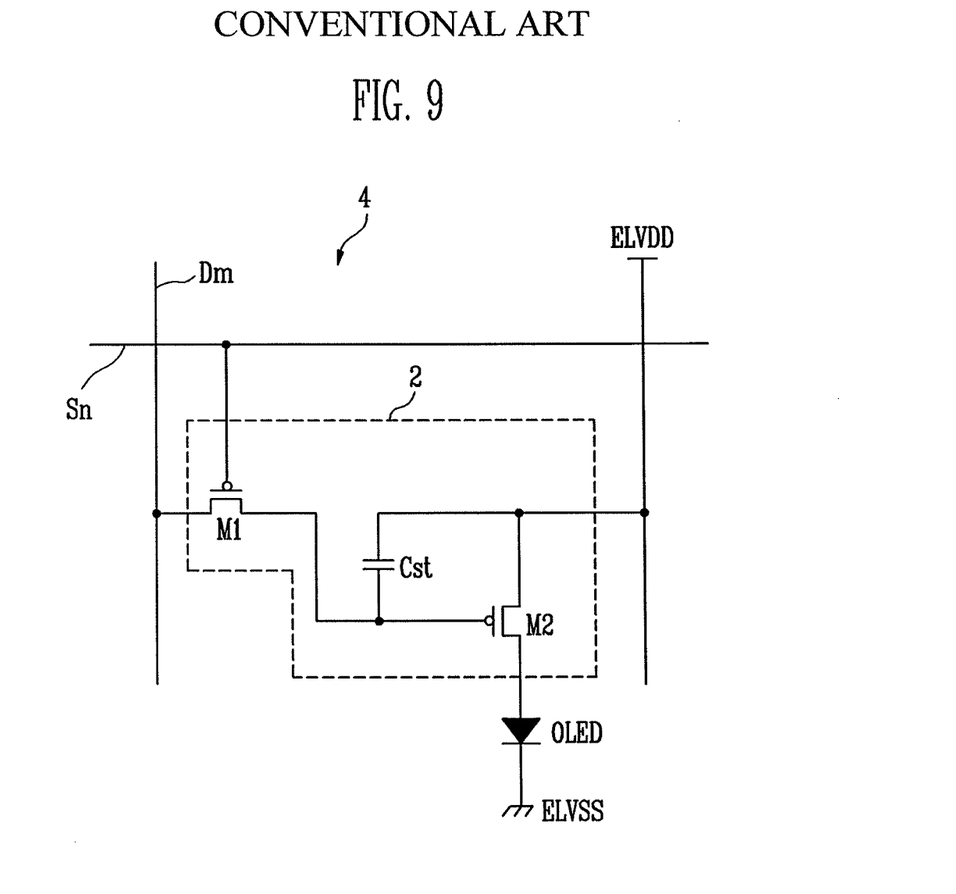
FIG. 9 is a circuit diagram illustrating a pixel of the conventional art.

FIG. 9 is a circuit diagram illustrating a pixel of an organic light emitting display device in the conventional art.

Referring to FIG. 9, a pixel 4 of an organic light emitting display device of the conventional art includes: an organic light emitting diode (OLED) and a pixel circuit 2 connected with a data line Dm and a scan line Sn. The pixel circuit 2 controls the organic light emitting diode (OLED).

The anode electrode of the organic light emitting diode (OLED) of the conventional art is connected to the pixel circuit 2. The cathode electrode is connected to a second power supply ELVSS. In response to the current supplied from the pixel circuit 2, the organic light emitting diode (OLED) produces light with predetermined luminance.

When a scan signal is supplied to the scan line Sn, the pixel circuit 2 of the conventional art controls the amount of current supplied to the organic light emitting diode (OLED) in response to a data signal supplied to the data line Dm. For this configuration, the pixel circuit 2 includes: a second transistor M2 connected between a first power supply ELVDD and the organic light emitting diode (OLED), a first transistor M1 connected between the second transistor M2, the data line Dm, and the scan line Sn, and a storage capacitor Cst connected between a gate electrode and a first electrode of the second transistor M2.

A gate electrode of the first transistor M1 of the conventional art is connected to the scan line Sn. A first electrode is connected to the data line Dm. A second electrode of the first transistor M1 is connected to one terminal of the storage capacitor Cst. In this configuration, the first electrode is set as any one of a source electrode and a drain electrode. The second electrode is set as the other electrode different from the first electrode. For example, when the first electrode is set as the source electrode, the second electrode is set as the drain electrode. When a scan signal is supplied through the scan line Sn, the first transistor M1, connected to the scan line Sn and the data line Dm, is turned on. Thus, the first transistor M1 supplies a data signal, which is supplied through the data line Dm, to the storage capacitor Cst. In this operation, the storage capacitor Cst is charged with a voltage corresponding to the data signal.

The gate electrode of the second transistor M2 of the conventional art is connected to one terminal of the storage capacitor Cst. The first electrode is connected to the first power supply ELVDD and the other terminal of the storage capacitor Cst. The second electrode of the second transistor M2 is connected to the anode electrode of the organic light emitting diode (OLED). In response to the voltage value stored in the storage capacitor Cst, the second transistor M2 controls the amount of current flowing from the first power supply ELVDD to the second power supply ELVSS through the organic light emitting diode (OLED). In this configuration, the organic light emitting diode (OLED) produces light, corresponding to the amount of current supplied from the second transistor M2.

The pixel 4 of the organic light emitting display device of the conventional art cannot display an image with uniform luminance. To be more specific, due to process variation, the second transistors M2 (driving transistor) in the pixels 4 have different threshold voltages for each pixel 4. As the threshold voltages of the driving transistors are different, light with different luminance is generated by the differences in the threshold voltages of the driving transistors. This occurs even if data signals corresponding to the same gradation are supplied to the pixels 4.

In order to overcome the problems of the conventional art, a structure forming a transistor in each pixel 4 to compensate the threshold voltage of the driving transistor has been proposed. A structure using six transistors and one capacitor for each pixel 4, to compensate the threshold voltage of a driving transistor has been disclosed (Korean Patent Publication No. 2007-0083072). However, six transistors included in the pixel 4 create complications. In particular, malfunction is increased by the transistors in the pixels 4. In addition, the yield is correspondingly decreased.

Therefore, by way of summary and review, present embodiments may provide a pixel having a simple structure and compensating the threshold voltage of a driving transistor. Present embodiments may also provide an organic light emitting display device using the pixel.

According to a pixel and an organic light emitting display device of present embodiments, it may be possible to compensate the threshold voltage of a driving transistor and a voltage drop of first power using a relatively simple pixel circuit. Thus, an image may be displayed with desired luminance. According to present embodiments, it is possible to ensure a sufficiently long time for compensating the threshold voltage of the driving transistor. According to present embodiments, there luminance non-uniformity is reduced or eliminated since a bias voltage is applied to the driving transistor for an initialization period.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the inventive concept as set forth in the following claims.

What is claimed is:

1. A pixel, comprising:
an organic light emitting diode;
an emission control line supplies an emission control signal, a control line supplies a control signal, and a scan line supplies a scan signal, the emission control signal, the control signal, and the scan signal being overlapped during a period;
a first transistor having a first electrode connected to a power line receiving a first power, the first power changing among an initial voltage, a reference voltage, and a high voltage, the first transistor controlling an amount of current supplied to the organic light emitting diode;
a second transistor connected between a data line and a second node, the second transistor turned on when a scan signal is supplied to a scan line;
a third transistor connected between a first node and a second electrode of the first transistor, the first node coupled to a gate electrode of the first transistor, and the third transistor having a turn-on time partially overlapping the turn-on time of the second transistor;
a fourth transistor connected between the second node and the power line, the fourth transistor having a turn-on time not overlapping the turn-on time of the second transistor; and
a storage capacitor connected between the first node and the second node, wherein the first power changes from the initial voltage to the reference voltage to the high voltage, and wherein the initial voltage is less than the reference voltage and the reference voltage is less than the high voltage, and wherein, when the high voltage is supplied to the power line, the supply of the emission control signal to the emission control line is stopped, and the high voltage, supplied to the power line, is supplied to the second node and the first electrode of the first transistor to control an amount of current flowing from the high voltage to a power supply through the organic light emitting diode.

2. The pixel as claimed in claim 1, further comprising:
a capacitor connected between an anode electrode of the organic light emitting diode and the power supply.

3. The pixel as claimed in claim 1, further comprising:
a fifth transistor positioned between a common power line receiving high voltage and the power line, the fifth transistor turned on when the high voltage is supplied to the power line.

4. The pixel as claimed in claim 1, wherein:
the high voltage supplied to the power line does not overlap turn-on periods of the second transistor and the third transistor.

5. The pixel as claimed in claim 1, wherein the storage capacitor stores a compensation voltage for the first transistor based on at least a transition of the first power from the initial voltage to the reference voltage.

6. The pixel as claimed in claim 5, wherein:
the first power has the initial voltage during a first time period,
the second power has the reference voltage during a second time period after the first time period, and
the second time period include a time sufficient to allow a threshold voltage for the first transistor to be stored in the storage capacitor.

7. The pixel as claimed in claim 6, wherein:
the storage capacitor stores a voltage based on the compensation voltage and a data voltage during a third time period after the second time period.

8. The pixel as claimed in claim 6, wherein:
a voltage corresponding to a capacitance of the organic light emitting diode is based on the initial voltage of the first power during the first time period,
the third transistor is in an on state during the second time period,
the first node is electrically connected to the organic light emitting diode through the third transistor during the second time period,
a voltage of the first node is adjusted based on the voltage corresponding to the capacitance of the organic light emitting diode during the second period, and
the threshold voltage is stored in the storage capacitor after the sufficient time based on the adjusted voltage of the first node.

9. An organic light emitting display device, comprising:
a plurality of pixels connected with scan lines, control lines, emission control lines, power lines, and data lines;
a scan driver driving the scan lines, the emission control lines, and the control lines;
a first power driver sequentially supplying a first power to each of the power lines, the first power applied to each of the power lines changing an initial voltage to a reference voltage higher than the initial voltage, and from the reference voltage to a high voltage higher than the reference voltage; and
a data driver supplying data signals to the data lines,
wherein each pixel of the plurality of pixels, in the i-th horizontal line includes:
an organic light emitting diode;
a first transistor having a first electrode connected to the i-th power line, the first transistor controlling an amount of current supplied to the organic light emitting diode;
a second transistor connected between the data line and a second node, the second transistor turned on when a scan signal is supplied to the i-th scan line;
a third transistor connected between a gate electrode and a second electrode of the first transistor, the third transistor turned on when a control signal is supplied to the i-th control line;
a fourth transistor connected between the second node and the i-th power line, the fourth transistor turned off when an emission control signal is supplied to the i-th emission control line, the fourth transistor turned on in other cases; and
a storage capacitor connected between the gate electrode of the first transistor and the second node, wherein, when the high voltage is supplied to the i-th power line, the supply of the emission control signal to the i-th emission control line is stopped, and the high voltage, supplied to the i-th power line, is supplied to the second node and the first electrode of the first transistor to control an amount of current flowing from the high voltage to a power supply through the organic light emitting diode.

10. The organic light emitting display device as claimed in claim 9, wherein: the scan driver supplies the control signal to the i-th control line for a period where the reference voltage is supplied to the i-th power line.

11. The organic light emitting display device as claimed in claim 9, wherein: the scan driver supplies the scan signal to the i-th scan line to overlap the control signal supplied to the i-th control line.

12. The organic light emitting display device as claimed in claim 9, wherein: the first power driver supplies the high voltage to the i-th power line, after the pixel in the i-th horizontal line is charged with voltage corresponding to a data signal.

13. The organic light emitting display device as claimed in claim 9, wherein: the scan driver supplies the emission control signal to the i-th emission control line to overlap the scan signal supplied to the i-th scan line.

14. The organic light emitting display device as claimed in claim 9, wherein: the initial voltage is set to a voltage where the plurality of pixels are in a non-emission state.

15. The organic light emitting display device as claimed in claim 9, further comprising: a capacitor connected between an anode electrode of the organic light emitting diode and a fixed the power supply.

16. The organic light emitting display device as claimed in claim 9, further comprising:
a common power line connected with all of the plurality of pixels; and
a fifth transistor included in the plurality of pixels and connected between any one of the power lines and the common power line.

17. The organic light emitting display device as claimed in claim 16, wherein: the fifth transistor is turned on for a period where the high voltage is supplied to the power line connected thereto.

18. An organic light emitting display device, comprising:
a plurality of pixels connected with scan lines, emission control lines, power lines, and data lines;
a scan driver sequentially supplying scan signals overlapping each other for a predetermined period to the scan lines, the scan driver sequentially supplying emission control signals to the emission control lines;
a first power driver sequentially supplying a first power to each of the power lines, the first power applied to each of the power lines changing from an initial voltage to a reference voltage higher than the initial voltage and from the reference voltage to a high voltage higher than the reference voltage; and
a data driver supplying data signals to the data lines,
wherein each pixel of the plurality of pixels, in the i-th horizontal line includes:
an organic light emitting diode;
a first transistor having a first electrode connected to the i-th power line, the first transistor controlling an amount of current supplied to the organic light emitting diode;
a second transistor connected between the data line and a second node, the second transistor turned on when a scan signal is supplied to the i-th scan line;

a third transistor connected between a gate electrode and a second electrode of the first transistor, the third transistor turned on when a scan signal is supplied to the i-th scan line;

a fourth transistor connected between the second node and the i-th power line, the fourth transistor turned off when an emission control signal is supplied to the i-th emission control line, the fourth transistor turned on in other cases; and a storage capacitor connected between the gate electrode of the first transistor and the second node, wherein, when the high voltage is supplied to the i-th power line, the supply of the emission control signal to the i-th emission control line is stopped, and the high voltage, supplied to the i-th power line, is supplied to the second node and the first electrode of the first transistor to control an amount of current flowing from the high voltage to a power supply through the organic light emitting diode.

19. The organic light emitting display device as claimed in claim 18, wherein: the scan driver supplies the scan signal to the i-th scan line to overlap the scan signal supplied to the i−1-th scan line, in one horizontal period 1H.

20. The organic light emitting display device as claimed in claim 18, wherein: the first power driver supplies the reference voltage to the i-th power line for a period where the scan signal is supplied to the i−1-th scan line.

21. The organic light emitting display device as claimed in claim 18, wherein: the first power driver supplies the high voltage to the i-th power line, after the pixel in the i-th horizontal line is charged with a voltage corresponding to a data signal.

22. The organic light emitting display device as claimed in claim 18, wherein: the scan driver supplies the emission control signal to the i-th emission control line to overlap the scan signal supplied to the i-th scan line.

23. The organic light emitting display device as claimed in claim 18, wherein: the initial voltage is set to a voltage where the pixels are in a non-emission state.

24. The organic light emitting display device as claimed in claim 18, further comprising: a capacitor connected between an anode electrode of the organic light emitting diode and the power supply.

25. The organic light emitting display device as claimed in claim 18, further comprising:

a common power line connected with all of the plurality of pixels; and a fifth transistor included in the plurality of pixels and connected between any one of the power lines and the common power line.

26. The organic light emitting display device as claimed in claim 25, wherein: the fifth transistor is turned on for a period where the high voltage is supplied to the power line connected thereto.

* * * * *